United States Patent
Bush

(10) Patent No.: US 6,548,038 B1
(45) Date of Patent: Apr. 15, 2003

(54) PROCESS FOR THE CONCENTRATION OF DILUTE SULPHURIC ACID SOLUTIONS

(75) Inventor: James Henry Bush, Calais (FR)

(73) Assignee: Tioxide Group Services Limited, London (GB)

(*) Notice: Subject to any disclaimer, the term of this patent is extended or adjusted under 35 U.S.C. 154(b) by 0 days.

(21) Appl. No.: 09/744,699

(22) PCT Filed: Jul. 29, 1999

(86) PCT No.: PCT/GB99/02486

§ 371 (c)(1),
(2), (4) Date: Jan. 29, 2001

(87) PCT Pub. No.: WO00/06487

PCT Pub. Date: Feb. 10, 2000

(30) Foreign Application Priority Data

Jul. 30, 1998 (GB) .............................................. 9816464

(51) Int. Cl.⁷ .......................... C01B 17/69; C01B 17/88
(52) U.S. Cl. ...................... 423/522; 423/529; 423/531; 423/DIG. 2
(58) Field of Search ................................ 423/522, 529, 423/531, DIG. 2; 203/12

(56) References Cited

U.S. PATENT DOCUMENTS 5,061,472 A * 10/1991 Lailach et al. .............. 423/531
5,228,885 A * 7/1993 Wagner ....................... 23/306

FOREIGN PATENT DOCUMENTS

| DE | 26 18 122 A1 | * | 11/1977 |
| EP | 0 133 505 A2 | * | 2/1985 |
| EP | 0 425 000 A1 | * | 5/1991 |
| EP | 0 429 933 A1 | * | 6/1991 |
| EP | 0 476 744 A1 | * | 2/1992 |

* cited by examiner

Primary Examiner—Stanley S. Silverman
Assistant Examiner—Timothy C. Vanoy
(74) Attorney, Agent, or Firm—Russ R. Stolle; Ron D. Brown; Christopher J. Whewell

(57) ABSTRACT

A process is provided for increasing the concentration of sulfuric acid in a waste solution of sulfuric acid previously used to produce titanium dioxide. The waste solution of sulfuric acid is fed into a first heat exchanger/evaporator stage that operates at a sulfuric acid concentration of less than 30%. A portion of the solution discharged from the first heat exchanger/evaporator is fed into a heat exchanger/evaporator that uses waste heat and operates at a sulfuric acid concentration that is greater than 40%, while the remainder of the solution discharged from the first heat exchanger/evaporator and the solution discharged from the heat exchanger/evaporator using waste heat is fed into a second heat exchanger/evaporator that operates at a sulfuric acid concentration that is greater than 50%.

1 Claim, 2 Drawing Sheets

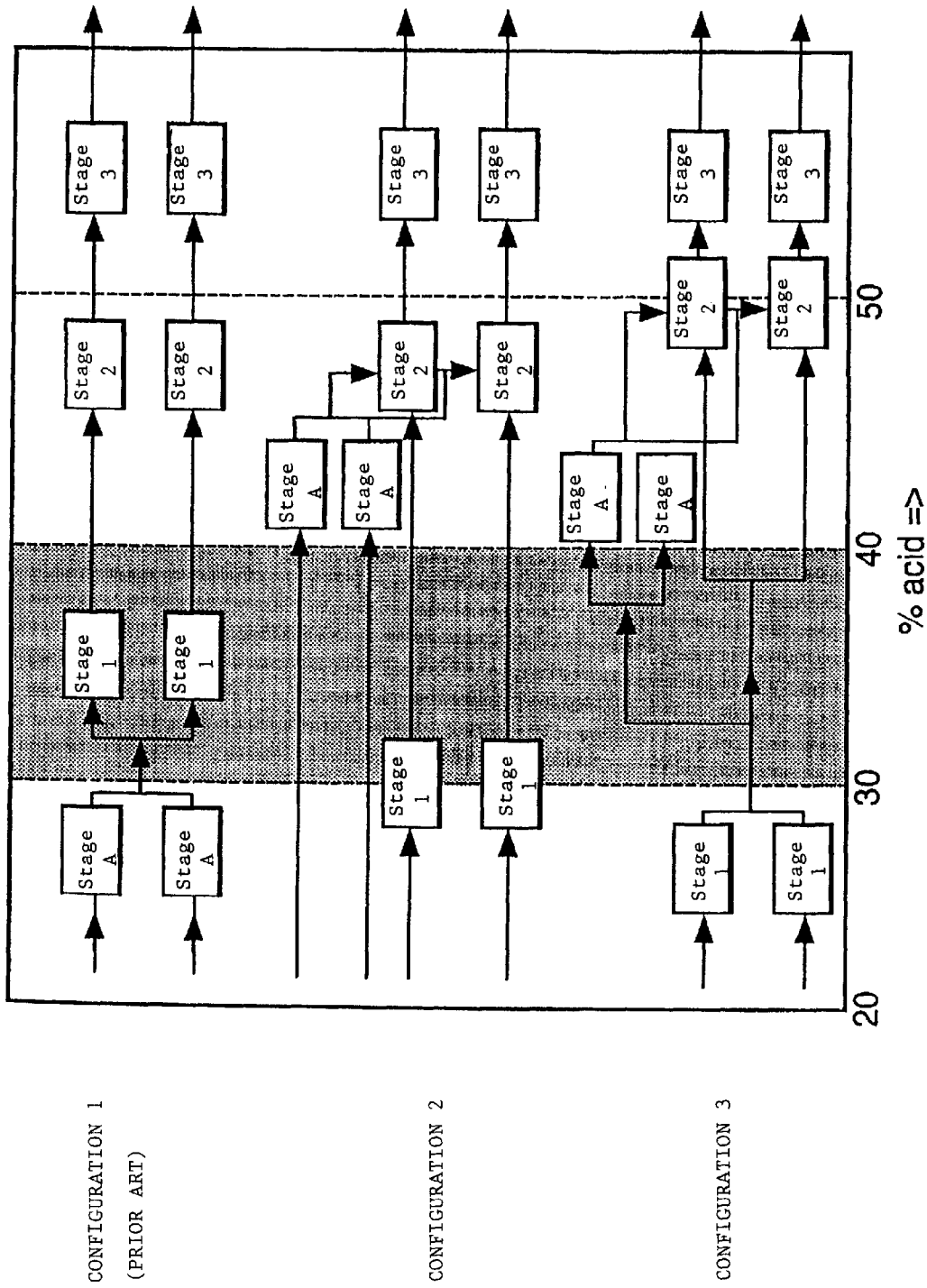

PROCESS FOR THE CONCENTRATION OF DILUTE SULPHURIC ACID SOLUTIONS

Figure 1:
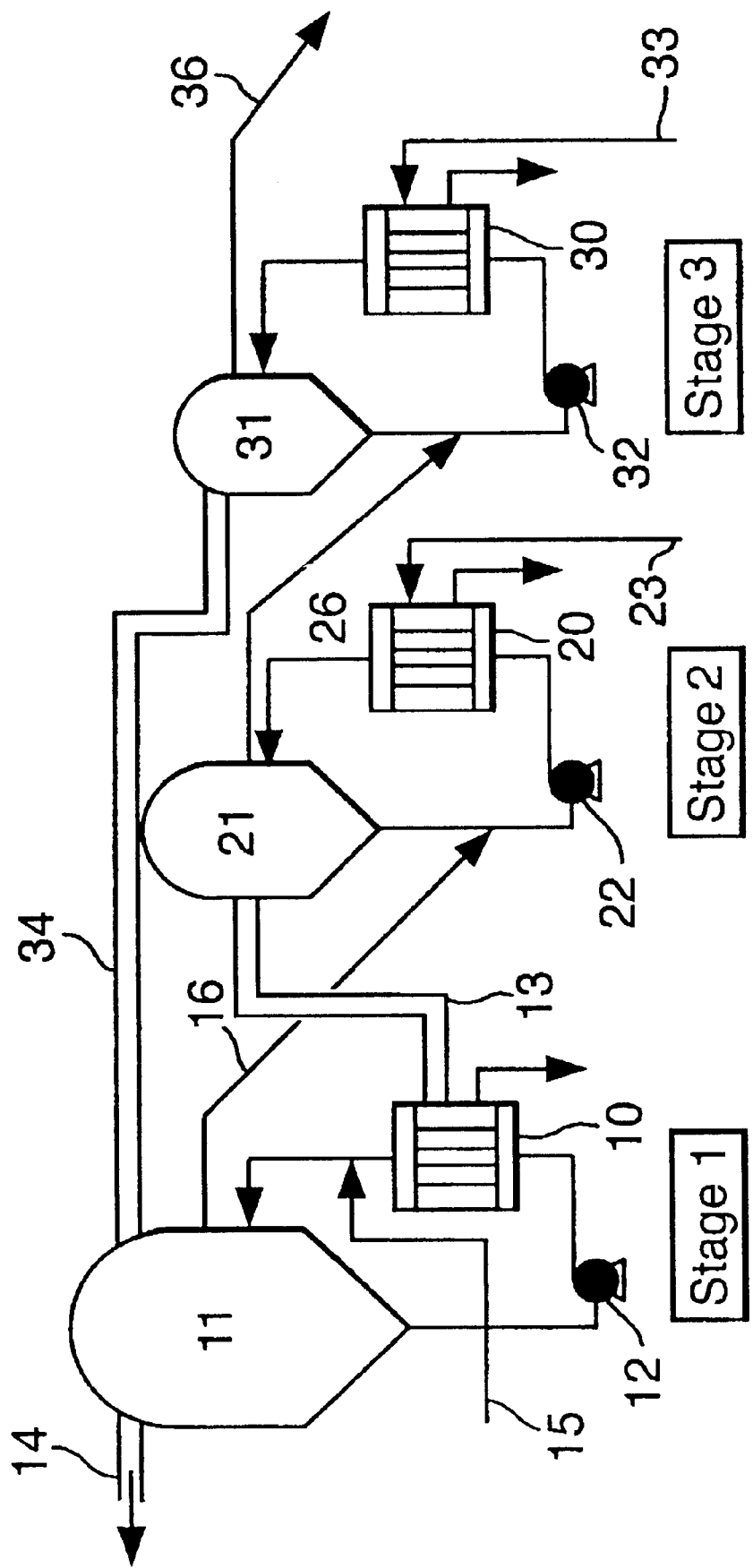

This invention relates to a process for the concentration of dilute sulfuric acid solutions, particularly dilute solutions containing iron (II) sulfate and other metal salts obtained, for example, during the production of titanium dioxide by the "sulphate" process.

In the "sulphate" process, the raw material (ilmenite or slag) is ground and dissolved in concentrated sulphuric acid to give a solution of titanium sulphate. This solution is hydrolysed to convert the titanium sulphate to titanium dioxide which is filtered off. The solution remaining after filtration contains 10–30% by weight sulphuric acid as well as large amounts of iron (II) sulfate and other metal salts. In the following description, this sulfuric acid is designated as "waste acid".

In order to be able to reuse the sulfuric acid in the waste acid, and particularly to be able to recycle it to the titanium dioxide manufacturing process, it is necessary to reconcentrate the waste acid and to separate the metal salts therefrom to the greatest possible extent. In the various known processes, the waste acid is reconcentrated to a concentration of 60 to 70% by weight sulphuric acid, the precipitated metal salts are separated out, and the reconcentrated acid is then either directly reused or concentrated further.

As storing the waste acid is impractical, any factor which affects the efficiency of the concentration process, particularly if it results in the process having to be halted, also has an effect on the rate of titanium dioxide production.

EP-A425000 discloses a process for concentrating dilute sulphuric acid using a multistage system, each stage consisting of a heat exchanger and a vacuum evaporator. The heating medium used is steam and to increase the economics of the process, the steam generated by the evaporation step in the second stage is used as the heating medium in the first stage.

It is well known that one of the problems associated with such a process using heat exchangers is that as the concentration of the acid increases, there is an increasing tendency for the salts to come out of solution and be deposited on the surface of the heat exchanger, resulting in the process having to be halted whilst such deposits are removed.

Although the major component of the metal salts present is ferrous sulphate, deposition of this material does not produce a particularly difficult problem as such deposits, being water soluble, are easily removed by washing.

A much greater problem is caused when calcium sulphate is present in the dilute acid as this material is insoluble in water and hence removal of deposits is expensive and time consuming. Moreover, calcium sulphate is a very efficient heat insulator and deposition rapidly affects the efficiency of the process.

The problem of calcium sulphate deposition is worst at acid concentrations between circa 34% and 39%. Below these concentrations the calcium sulphate stays in solution and above them a precipitated salt phase forms (comprising ferrous sulphate as well as calcium sulphate) so there is no precipitation on surfaces directly from solution.

According to EP-A425000, the concentration of the acid in the first stage should be kept at 40% or less, i.e. it is suggesting that the system should be operated in a manner leading to maximum calcium sulphate deposition.

EP-A-425000 also suggests that it may be useful to heat the dilute acid prior to the concentration process using waste heat.

In accordance with common chemical engineering terminology, "waste heat" refers to heat, usually in the form of steam or hot water, which has been used previously as a heating medium and which is consequently at a lower temperature than when originally generated and is to be distinguished from "live" heat, again usually in the form of steam or hot water, which has been generated at a temperature suitable for a particular purpose.

A suitable source of such heat is hot water resulting from condensation of the steam used in steam microniseres which are commonly used to mill the titanium dioxide to produce pigment grade material.

A more economic process than described in EP-A-425000 is to use the waste heat in a heat exchanger/evaporation system. In accordance with the disclosure of EP-A425000, the logical position of such a system is as a pre concentrator.

According to one aspect of the invention, there is provided a process for the concentration of dilute sulphuric acid containing metal salts using a multistage heat exchanger vacuum evaporator system, comprising the steps of a) feeding part of the acid to the first stage of the multistage system operating at an acid concentration of less than 30%.

b) feeding the remainder of the dilute acid to a separate heat exchanger vacuum evaporator using waste heat as the heating medium and operating at an acid concentration of greater than 40%.

c) feeding the acid from steps (a) and (b) to the second stage of the multistage system operating at a concentration of greater than 50% and recycling steam generated in the evaporator as the heating medium for the first stage, and d) feeding the acid from the second stage to such subsequent steps as are necessary to produce the required final acid concentration.

According to a further aspect of the invention, the process comprises the steps of a) feeding the dilute acid to the first stage of the multistage system operating at an acid concentration of less than 30% b) feeding part of the acid from step (a) to a heat exchanger/vacuum evaporator system heated using waste heat and operating at an acid concentration greater than 40%.

c) feeding the acid from step (b) with the remainder of the acid from step (a) to the second stage of the multistage system operating at an acid concentration greater than 50% and recycling steam generated in the evaporator as the heating medium for the first stage, and d) feeding the acid from the second stage to such subsequent steps as are necessary to produce the required final acid concentration.

In this manner, circulation of acid through a heat exchanger/evaporation stage at a concentration at which there is maximum calcium sulphate deposition, is avoided.

In addition, interposing the stage in which waste heat is used as the heating medium between stages 1 and 2 means that the heat exchange between the steam generated in stage 2 and the relatively cooler acid in stage 1 is more efficient.

The invention will be more readily understood from the following description drawing and example.

In the drawing;

FIG. 1 is a schematic diagram of a multistage, indirectly heated, evaporation system using steam as the heating medium; and FIG. 2 is a plan showing alternative configurations of a two-line system.

Referring to FIG. 1, the multistage system shown consists of 3 stages, each consisting of a heat exchanger (10, 20, 30), a vacuum evaporator (11, 21, 31) and a pump (12, 22, 32) for circulating the acid around the heat echanger/evaporator loop. Stages 2 and 3 are heated by "live" steam through lines 23 and 33 whereas Stage 1 is heated by the vapour produced in the evaporator 21 through line 13. Vapour produced in the evaporators 11 and 31 is removed to a condenser (not shown) through lines 14 and 34.

Dilute acid is fed into Stage 1 via line 15, the volume ratio of the dilute acid feed to the acid circulating in the loop being circa 1:100. Lines 16, 26 and 36 feed the increasingly concentrated acid, under gravity, from Stage 1 to Stage 2, Stage 2 to Stage 3 and from Stage 3 to further processing steps, for example, maturation and filtration.

In addition to the multistage system, the overall apparatus includes a single stage heat exchanger/vacuum evaporator system similar to the individual stages shown in FIG. 1 except that the heating medium is waste heat provided, for example, by condensation of steam from steam micronisers. To distinguish this system from the multistage system, it is hereinafter designated as "Stage A".

In FIG. 2, Configuration 1 shows the arrangement as suggested by the teaching of EP-A425000, Configuration 2 shows the arrangement in accordance with the first aspect of the invention and Configuration 3 shows the arrangement in accordance with the second aspect of the invention.

In accordance with Configuration 1, the dilute acid to be treated is fed solely to Stage A operating at a concentration of <30%, the output from Stage A being fed to Stage 1 operating at a concentration of between 30% and 40%, i.e. at an acid concentration at which calcium sulphate deposition is a maximum. Stages 2 and 3 operate at circa 46% and 52% respectively and the output from Stage 3 is passed for further treatment, e.g. maturation and filtration.

In Configuration 2, the dilute acid is fed in a volume ratio of circa 2:6:1 to Stage 1 operating at an acid concentration of circa 30% and to Stage A operating at circa 40% concentration. Stages 2 and 3 operate in the same manner as in Configuration 1.

As an alternative, in configuration 3, all the dilute acid is fed to Stage 1 operating at a concentration of less than 30%. The output of Stage 1 is fed partly to Stage A operating at a concentration of circa 42% and partly to Stage 2 where it is mixed with the output of Stage A. Stage 2 operates at a concentration of circa 50%.

Hence in Configurations 2 and 3, none of the apparatus is operating at an acid concentration where calcium sulphate deposition is a major problem.

With Configuration 1, fouling of Stage 1 occurs at a rate of 1.0 mm/week necessitating shut down and cleaning every three weeks. With Configuration 2 the cleaning interval is extendable to 3–9 months due to a reducing in fouling to less than 0.1 mm/week. In addition, the maximum feed rate may be increased by circa 10% with the potential, in the case of Configuration 3, of an increase of 30%. Finally, it was found that Configuration 3 gave a 20% steam saving compared to Configuration 1.

I claim:

1. A process for increasing the concentration of sulphuric acid in a solution of waste acid containing 10–30% sulfuric acid and further containing metal salts using a multistage heat exchanger vacuum evaporator system, comprising the steps of a) feeding the dilute acid to the first evaporator stage of the multistage evaporator system operating at an acid concentration of less than 30%;

b) feeding part of the acid from step (a) to a heat exchanger/vacuum evaporator system heated using waste heat and operating at an acid concentration greater than 40%, and c) feeding the acid from step (b) with the remainder of the acid from step (a) to the second stage of the multistage system operating at an acid concentration greater than 50% and recycling steam generated in the second stage evaporator as the heating medium for the first stage.

* * * * *